H. T. PARMFELT & F. A. TULLBERG.
HARVESTER.
APPLICATION FILED JAN. 17, 1914.

1,149,681.

Patented Aug. 10, 1915.
4 SHEETS—SHEET 1.

H. T. PARMFELT & F. A. TULLBERG.
HARVESTER.
APPLICATION FILED JAN. 17, 1914.

1,149,681.

Patented Aug. 10, 1915.
4 SHEETS—SHEET 2.

H. T. PARMFELT & F. A. TULLBERG.
HARVESTER.
APPLICATION FILED JAN. 17, 1914.
1,149,681.
Patented Aug. 10, 1915.
4 SHEETS—SHEET 3.
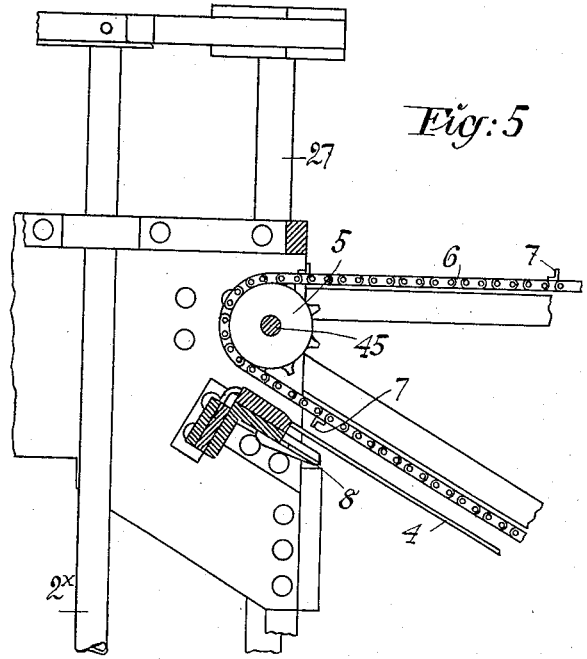
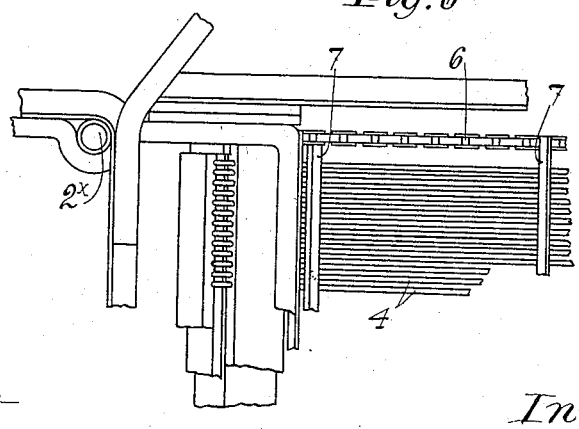

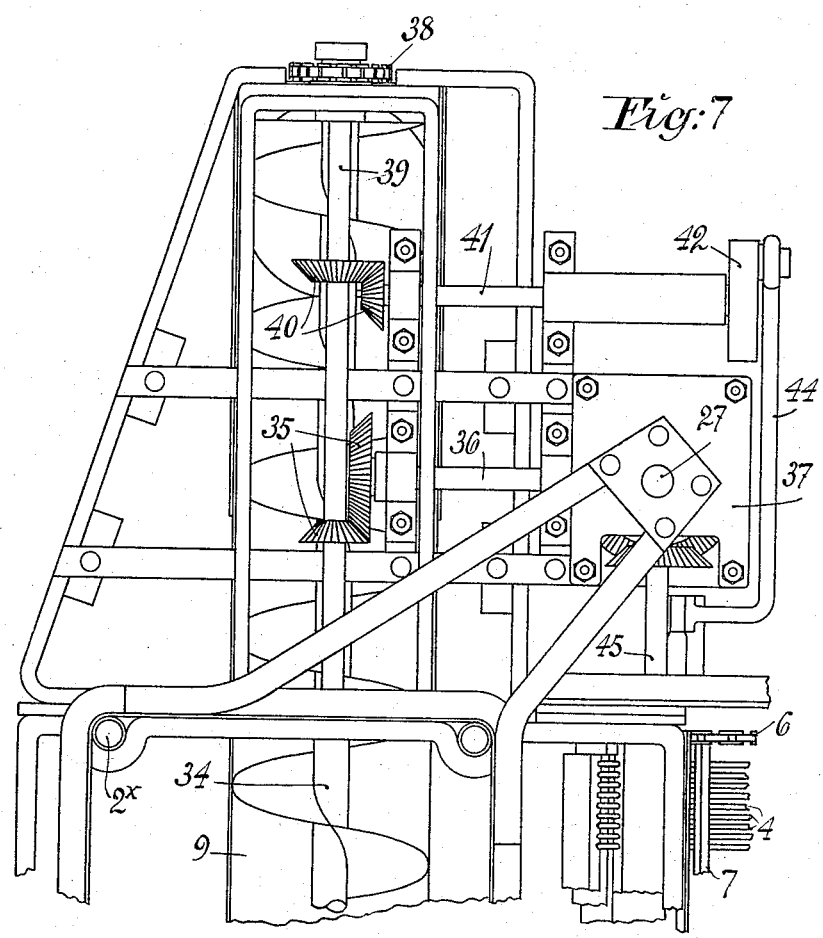

UNITED STATES PATENT OFFICE.

HARALD TRYGGVE PARMFELT, OF LUND, AND FRIDOLF ALLBERT TULLBERG, OF ALNARP, ÅKARP, SWEDEN; SAID TULLBERG ASSIGNOR TO SAID PARMFELT.

HARVESTER.

1,149,681.  Specification of Letters Patent.  Patented Aug. 10, 1915.

Application filed January 17, 1914. Serial No. 812,751.

*To all whom it may concern:*

Be it known that we, HARALD TRYGGVE PARMFELT, a subject of the King of Sweden, and resident of Södra Esplanaden 8, Lund, in the Kingdom of Sweden, and FRIDOLF ALLBERT TULLBERG, a subject of the King of Sweden, and resident of Alnarp, Åkarp, in the Kingdom of Sweden, have invented certain new and useful Improvements in Harvesters, of which the following is a specification, reference being had therein to the accompanying drawings.

Harvesters hitherto known cut off the straws immediately above the ground, gather the same and sometimes bind the same in sheaves, which are placed behind the machine or at the side of the same. This invention relates to a harvester, which differs from harvesters before known by the fact that the straws are cut off at two points viz. at the roots i. e. near the ground, and immediately below the ears, so that the ears are separated from the straws. The ears thus cut off are gathered in a suitable receptacle, while the straws are placed behind the machine or at the side of the same by a suitable conveyer.

A form of the invention is shown in the accompanying drawings.

Figure 1:
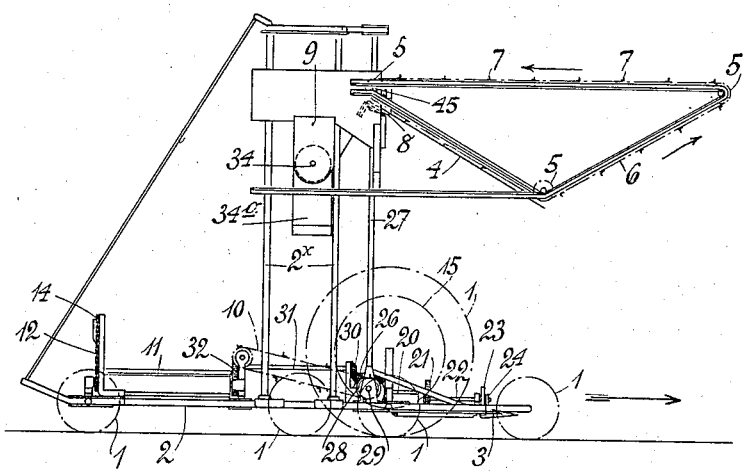
Figure 2:
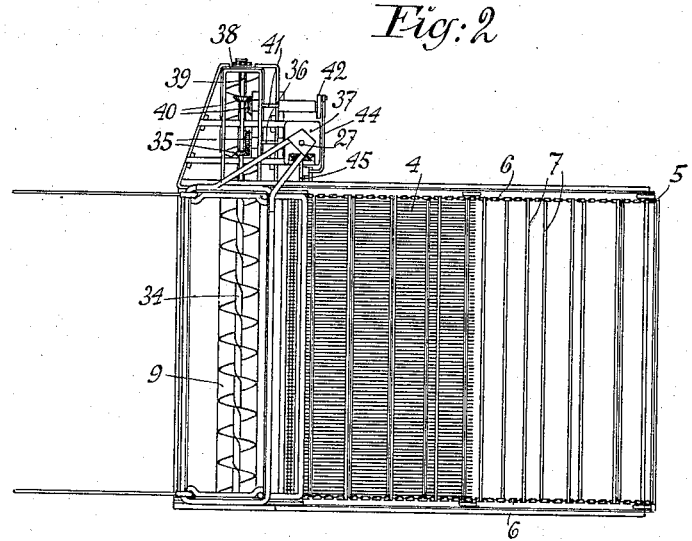
Figure 3:
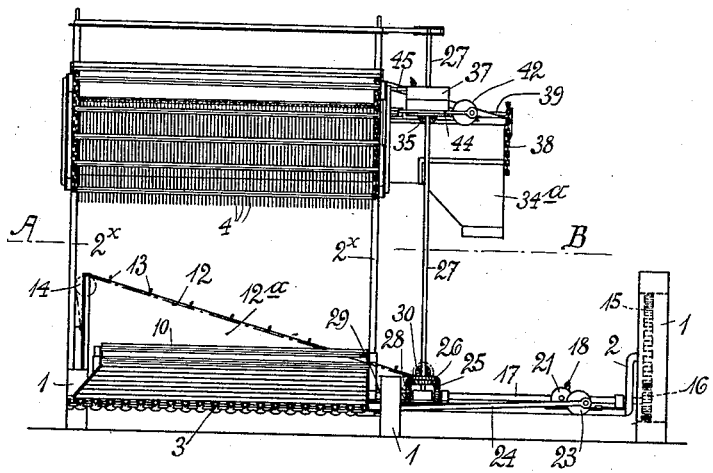
Figure 4:
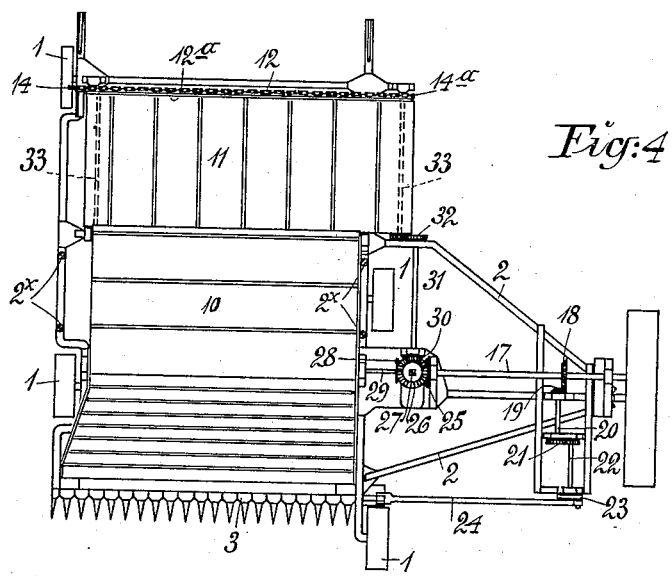

Figure 1 is a side view and Fig. 2 a plan view of the fore part of the harvester. Fig. 3 is a front view of the harvester. Fig. 4 is a section on the line A to B of Fig. 3. Figs. 5 and 6 are a side view and a plan view respectively of a detail. Fig. 7 shows in a plan view and on a greater scale a part of the harvester.

The harvester comprises a frame 2, carried by wheels 1. In the lower, fore part of the said frame the cutting knives 3 are provided fixed to a rod extending transversely of the motion direction of the machine and reciprocated by a mechanism described below. The said knives cut off the straws at a short distance above the ground. In the top part of the frame 2 a comb 4 is provided, consisting of a plurality of parallel, narrow rods, extending forward and, if necessary downward. During the operation of the harvester the straws pass into the spaces between the said rods either by themselves or moved into the same by a feed device. The said feed device may consist of two endless chains 6, passing around sprocket wheels 5 and connected by a plurality of ribs 7, transverse to the rods of the said comb. The chains 6 and the ribs 7 are moved in the direction indicated by the arrows in Fig. 1 and the ribs engage the straws and move the same into the spaces between the rods of the comb 4, with the ears located above the rods. At the rear end of the comb 4 a second reciprocated rod with knives 8 is provided (Figs 1 and 5), extending transversely of the machine, which cutting knives, consequently, are located at a considerably higher level than the knives 3 and somewhat behind the same with relation to the moving direction of the harvester. The knives 8 cut off the straws immediately below the comb i. e. immediately below the ears, so that the latter will fall into a box 9, located behind the comb, while the straws fall upon a slanting surface and upon an endless conveyer 10, which moves the same backward to a second endless conveyer 11, which is moved transversely of the machine and transports the straws to one of the sides of the same. At the rear edge of the conveyer last mentioned an endless chain 12 is provided having projections 13 or the like and moved in the same direction as the conveyer. The sprocket wheel 14 supporting the chain 12 at the side of the machine opposite to the delivery side of the same is located at a higher level than the sprocket wheel $14^a$ located at the side last mentioned, so that the top part of the chain has a slanting position. The said chain 12 together with a wall $12^a$, also located at the rear edge of the conveyer 11 and having an oblique top edge corresponding to the slanting position of the chain 12, prevent the straws from falling down behind the machine, while the chain assists in moving the straws toward the delivery side of the machine.

The means transmitting the motion from the wheels of the harvester to the operating parts of the same may be of any suitable construction. In the form shown in the drawings the greatest wheel 1 is provided at its inner side with teeth 15 meshing with a toothed wheel 16, which is fixed to a transverse shaft 17, journaled in the frame 2. From the said shaft 17 motion is transmitted to the operating parts of the machine. To the shaft 17 a bevel-wheel 18 is fixed, meshing with a bevel-wheel 19, which is fixed to a shaft 20 forming a right angle with the shaft 17. The said shaft 20 rotates by means of a gearing 21 a shaft 22, provided at its fore end with a crank disk 23, which reciprocates the rod carrying the knives 3 by means of a pitman 24. To the inner end of the shaft 17 a bevel-wheel 25 is fixed, meshing with a double bevel-wheel 26 fixed to a vertical shaft 27. The said bevel-wheel 26 meshes with a bevel-wheel 28, fixed to the driving shaft 29 of the endless conveyer 10, and with a bevel-wheel 30 fixed to a backward extending shaft 31, which by means of a gearing 32 rotates one of the shafts 33 of the endless conveyer 11. The same shaft 33 also actuates the endless chain 12.

At the bottom of the box 9 a screw conveyer 34 or any other suitable conveyer is provided which moves the cut off ears to a delivery funnel 34ª located at the side of the machine. The said screw 34 is rotated by means of a chain 38 and sprocket wheels by a top shaft 39, which is rotated by a bevel gear 35. One of the wheels of the said gearing 35 is fixed to a shaft 36, which is rotated by the shaft 27 by means of a gearing not shown and located in a latch gear casing 37. The shaft 39 rotates by means of a bevel gear 40 a shaft 41, provided at its fore end with a crank disk 42, which reciprocates the rod carrying the knives 8 by means of a pitman 44. The rear wheels 5 of the feed device 6, 7 are fixed to a shaft 45, which is rotated by the gearing in the latch gear casing 37.

In order that the harvester may be adapted to straws of different heights the rod carrying the knives 8, the box 9, the funnel 34ª, the feed device 6, 7, the comb 4, the latch gear casing 37 and the gearings 35, 40 are as a whole adjustable to different levels on the uprights 2ˣ of the frame. In order to facilitate the said adjustment the center wheel of the latch gear casing is movable longitudinally of the shaft 27 but can not rotate on the same. This may be effected for instance by the shaft 27 being square or provided with a longitudinal key engaging a recess provided in the hub of the said center wheel.

The mode of operation of the harvester is easily understood from the above description. The straws are caught by the comb 4 and are then cut off by the knives 3, so that the straws will hang on the ears, supported by the rods of the said comb 4. Owing to the forward movement of the machine in the crop and by means of the feed device 6, 7 the straws, cut off at their lower ends are moved up the comb until the ears are cut from the straws by the top knives 8. The advantage of gathering in the ears separately is obvious. For instance they may easily be dried in kilns. The straws may be gathered afterward.

Having now described our invention, what we claim as new and desire to secure by Letters Patent is:

1. In a harvester the combination of knives located in position to cut the straws near the ground, a comb located above the knives in position to receive the straws below their ears and hold the straws suspended and other knives located at the rear portion of the comb in position to sever the ears from the straws.

2. In a harvester the combination of knives located in position to cut the straws near the ground, a comb located above the knives in position to receive the straws below their ears and hold the straws suspended, a feed device for assisting in moving the straws into the said comb, and other knives located at the rear portion of the comb in position to sever the ears from the straws.

3. In a harvester the combination of knives located in position to cut the straws near the ground, a comb located above the knives in position to receive the straws below their ears and hold the straws suspended, other knives located at the rear portion of the comb in position to sever the ears from the straws, a conveyer for moving backwardly the straws from which the ears have been severed, and a conveyer for moving the said straws to one of the sides of the harvester.

4. In a harvester the combination of knives located in position to cut the straws near the ground, a comb located above the knives in position to receive the straws below their ears and hold the straws suspended, other knives located at the rear portion of the comb in position to sever the ears from the straws, a box located behind the said comb, into which the ears may fall, and a conveyer located at the bottom of the said box for moving the ears to one side of the harvester.

5. In a harvester the combination of knives located in position to cut the straws near the ground, a comb located above the knives in position to receive the straws below their ears and hold the straws suspended, a feed device for assisting in moving the straws into the said comb, other knives located at the rear portion of the comb in position to sever the ears from the straws, a box located behind the said comb, into which the ears may fall, a conveyer located at the bottom of the said box for moving the ears to one side of the harvester, and a latch gear casing for transmitting motion to the knives last mentioned, the said feed device and the conveyer, the said comb, knives, box and latch gear casing being adjustable vertically as a whole in the frame of the harvester.

In witness whereof, we have hereunto signed our names in the presence of two subscribing witnesses.

HARALD TRYGGVE PARMFELT.
FRIDOLF ALLBERT TULLBERG.

Witnesses:
L. HÉLTON,
H. FRISELL.

Copies of this patent may be obtained for five cents each, by addressing the "Commissioner of Patents, Washington, D. C."